Jan. 28, 1936.   F. G. MATRAVERS   2,028,939
FOLLOWER FOR STEERING GEARS FOR VEHICLES
Filed June 10, 1935   3 Sheets-Sheet 1
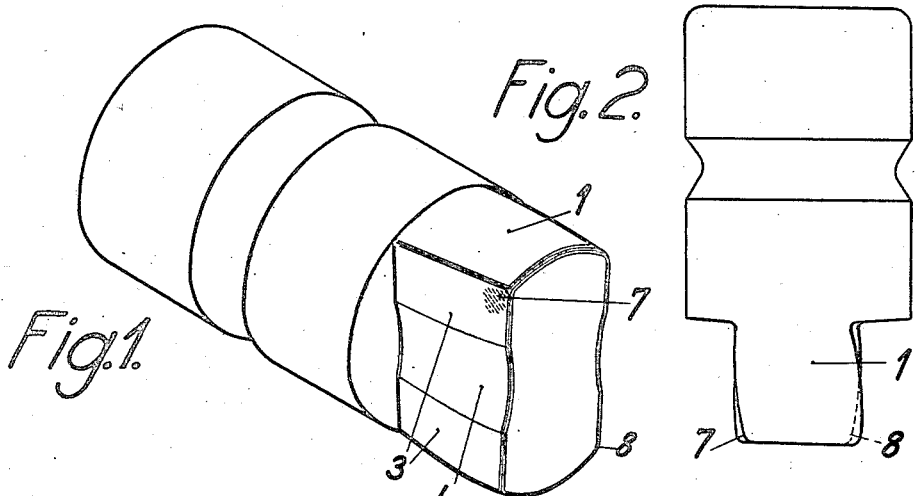
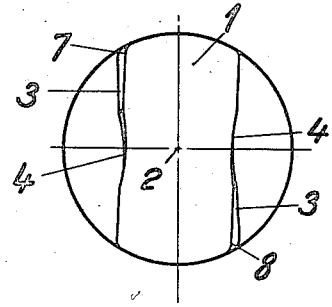
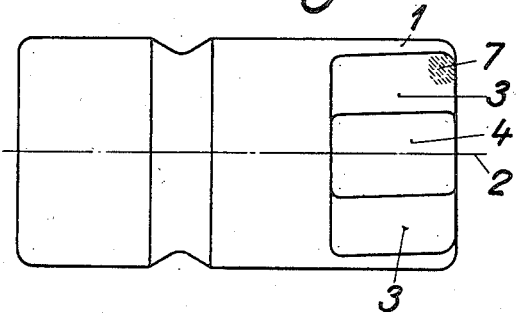
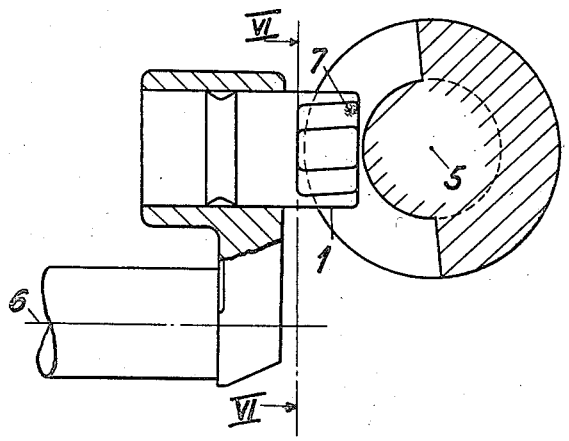
INVENTOR
Frederick George Matravers.
BY Arthur J. Sixohns
ATTORNEY.

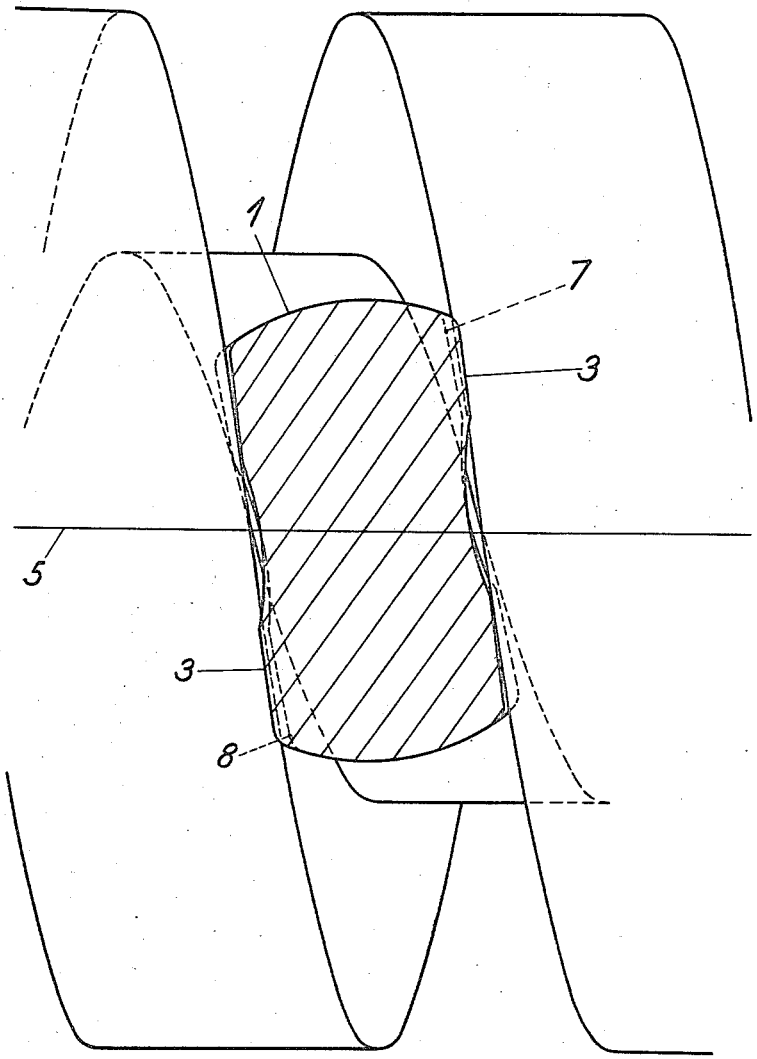

Jan. 28, 1936.  F. G. MATRAVERS  2,028,939
FOLLOWER FOR STEERING GEARS FOR VEHICLES
Filed June 10, 1935  3 Sheets-Sheet 3

INVENTOR
Frederick George Matravers.
BY Arthur J. Stephens
ATTORNEY

Patented Jan. 28, 1936

2,028,939

UNITED STATES PATENT OFFICE 2,028,939

FOLLOWER FOR STEERING GEARS FOR VEHICLES

Frederick George Matravers, Harpenden, England, assignor to Adamant Engineering Company Limited, Luton, Bedfordshire, England, a company of Great Britain Application June 10, 1935, Serial No. 25,819
In Great Britain October 23, 1934

7 Claims. (Cl. 74—458)

In my application Serial No. 717,545, I have described steering gears in which a helical thread is engaged by a single unit follower whose engaging end has side contacting surfaces. The follower is mounted in a steering arm and is free to rotate relatively to it about its longitudinal axis. The contacting surfaces may be substantially parallel or alternatively inclined to one another according to whether the follower is adapted to engage a helical thread of rectangular cross section or of tapered cross section. The surfaces vary slightly from plane surfaces in order that the follower may have free movement throughout its travel.

The object of the present invention is the manufacture of an improved follower of this type, which will accommodate itself in operation closely and accurately with the helical thread and consequently will have a considerable area of contact between itself and the thread at all points of its movement.

According to this invention the engaging end of the follower is substantially helically shaped about its longitudinal axis. In other words the line of intersection between a contacting surface and the surface of any cylinder co-axial with the longitudinal axis is substantially a helix about that axis.

In the manufacture of a follower according to the invention, the contacting surfaces of its engaging end are shaped by being passed across the circumferential face of a rotary cutter, in such a way that the passage of the follower comprises a linear movement perpendicular to an arbitrarily chosen plane parallel with the rotational axis of the cutter, together with a rotational movement about an axis perpendicular to said plane. Preferably the two contacting surfaces of the follower will be profiled in one operation by being passed between the circumferential faces of two rotary cutters, whose axes of rotation are in the same plane.

Although a milling operation with a rotary milling cutter is specified, it should be understood that the surfaces may be shaped otherwise, for instance by a grinding operation. The term "rotary cutter" is intended to cover rotary tools for milling, grinding and like operations.

The invention will be more fully understood by reference to the accompanying drawings in which:—

Figure 1 is a perspective view of the improved follower,

Figures 2, 3 and 4, are respectively, a plan, side elevation, and end elevation of the improved follower, Figure 5 is an end view of a helical thread showing the follower in engagement with it, in an intermediate position of its travel.

Figure 6 is a section on the line VI—VI of Figure 5 on an enlarged scale, and

Figure 7:
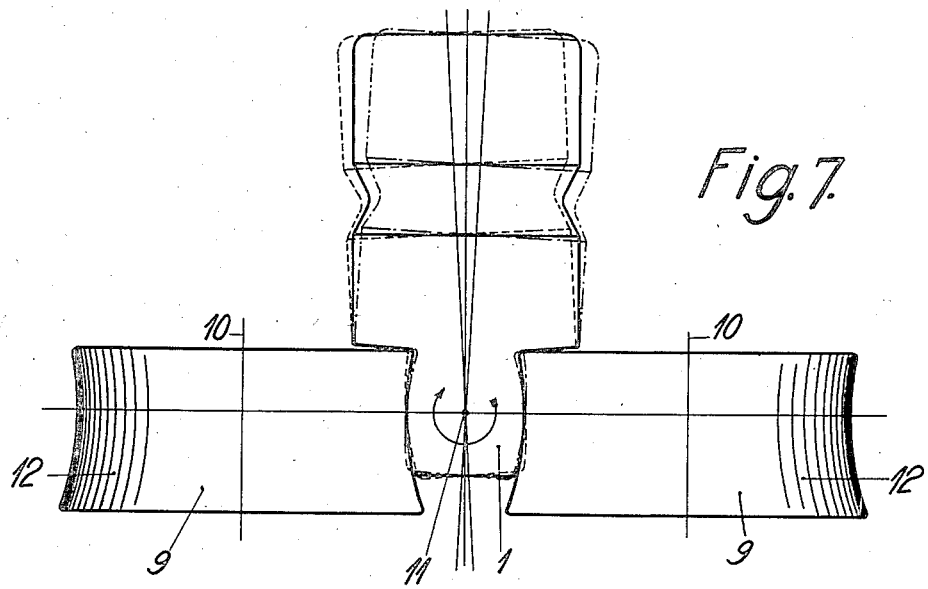
Figures 7 and 8 are respectively a plan and perspective view showing diagrammatically the passage of the engaging end of a follower between the circumferential faces of two rotary cutters.

Referring to Figures 1 to 4 which show the improved form of follower, it will be seen that the engaging end 1 is substantially helical about the longitudinal axis 2; that is to say its form is such that it appears to have been twisted about the axis 2. As illustrated the contacting surfaces 3 of the follower are provided with shallow recesses 4 arranged centrally and approximately parallel to the axis 2, as described in our patent specification mentioned above. The recesses 4 separate areas of contacting surfaces 3 on each side of the engaging end of the follower. In this way pressures to which the follower in operation is subjected are distributed more evenly over the follower. As shown more particularly in Figure 2, the contacting surfaces 3 of the follower are "barrelled", that is, they are convex in directions parallel to the axis 2.

Referring now to Figure 6, which shows a helical thread of rectangular cross section and constant pitch in side elevation, it is immediately apparent why the engaging end of the follower should be substantially helical about its longitudinal axis. The angle of lead of the helix at the bottom of the thread is greater than that at the top of the thread. Consequently in the thread shown in the drawings, the engaging end of the follower must project inwardly to the left above the axis 5 and inwardly to the right below the axis 5. Since the follower is mounted on a steering arm rotatable about an axis such as that marked 6 in Figure 5, it will move during its travel from one end to the other of the thread, both above and below the position shown in Figure 6. Preferably, the length of the steering arm is such that the follower in its travel moves as far above the axis 5 as it does below it. It will be in the lowest position when the steering gear is in the position of "full lock" either to the left or right. The follower will be in the highest position when the steering gear is set for "straight ahead". Thus the relative positions of thread and follower shown in Figures 5 and 6 will occur at the "half lock" positions either to right or left. In this way a follower which is symmetrical above and below the axis 5, may be used, with the consequent advantage that it may be more easily manufactured and that it may be fitted to the thread either way up.

It should be understood that a follower with side contacting surfaces which are a perfect fit with the sides of the helical thread when in the central position shown in Figure 6 is impracticable. Such a follower is incapable of the up and down movement relative to the thread described above. As a result the form of the engaging end of a follower according to this invention is formed so as to approximate to the shape of those parts of the thread with which it engages. It is more particularly for this reason that the engaging end of the follower is "barrelled" as explained above. Thus due to this "barrelling" the areas 7 and 8 (see Figures 5 and 6) are not in contact in the position shown; however in the upper position of the follower the area 7 will contact closely with the adjacent side of the thread, whilst in the lower position of the follower the area 8 will contact closely with the other side of the thread. Similarly in all positions of the follower comparatively large areas of the side contacting surfaces are in contact with the sides of the helical thread.

Figure 8:
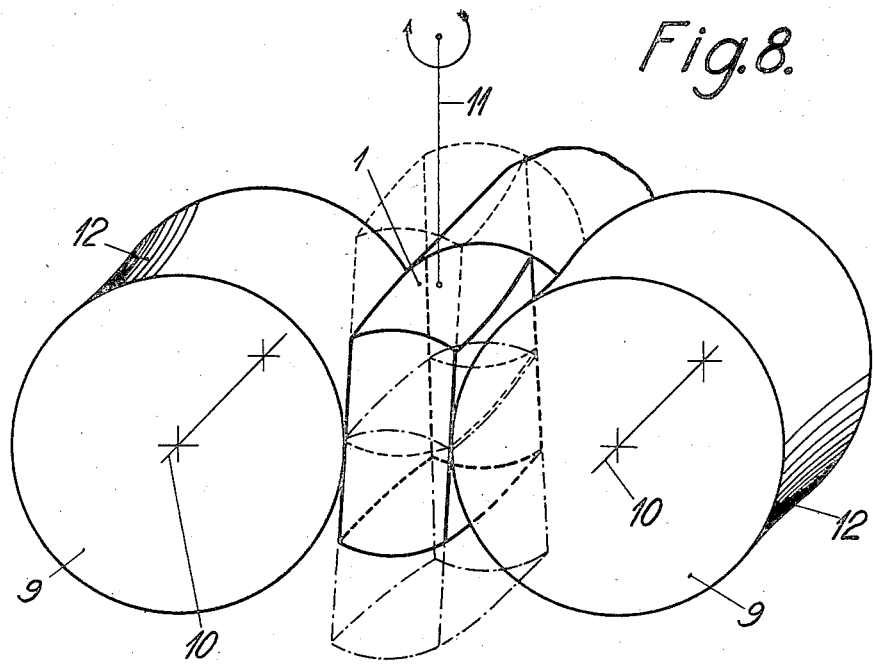

The engaging end of the follower is preferably shaped by the method shown in Figures 7 and 8. By this method the engaging end is passed between the two rotary cutters 9 which rotate about parallel axes 10. The follower's passage during the cutting operation comprises a linear movement perpendicular to the plane of the axes 10 and simultaneously a rotational movement about the axis 11; this axis preferably passes through the centre of gravity of the engaging end, as shown, so that both ends and also both contacting surfaces are identical with one another. At the beginning of the cutting operation the follower is in the position shown in dotted lines, half way through the operation it is in the position shown in full lines, and at the end in the position shown in chain dotted lines. In order to form the contacting surfaces with the "barrel" shape described, the circumferential faces 12 of the cutters 9 are concave; in this way the said surfaces will be cut convex in directions parallel with the axis 2. By this method of shaping a follower may be constructed so as to have the desired form shown in Figures 1 to 4.

It should be understood that in shaping followers for use with different types of helical thread, the curvature of the surfaces of the cutters and the relative rates of linear and rotational movement during the cutting operation will vary with the diameter, the depth and the pitch of the helical thread, the length of the steering arm, and also with the width of the engaging portion, which as shown is equal to the diameter of the follower.

To indicate the order of magnitude of the movements given to the follower to engage a given thread, the following is an example; the follower in question was for engagement with a helical threaded cam of external diameter 2.2 inches, of pitch 1.1 inches, and depth of thread .4 inches. The follower was produced from a round bar ⅞th of an inch in diameter. The contacting surfaces were formed by passing the engaging end between two rotary cutters whose faces were set apart a distance equal to the width of the cam thread. The faces of the rotary cutters were concave with a radius of curvature of 2.4 inches to produce the desirable "barrelled" shaped. Whilst the follower was in contact with the cutters, i. e. during a linear movement of approximately ⅞th of an inch, the follower was rotated through an angle of 8 degrees.

The two sides of the engaging end may of course be shaped by separate operations on a machine having a single cutter. Moreover it should be understood that it is not essential for the axis of the cutter to be substantially parallel with the longitudinal axis of the follower. A conically-shaped cutter may be used rotating about an axis set at an angle to the longitudinal axis of the follower, so long as the linear movement of the follower is perpendicular to an arbitrarily chosen plane parallel with the cutter's axis. If a pair of conically-shaped cutters are employed to shape both faces of the engaging end in a single operation, it is necessary that their axes of rotation should lie in the same plane and that the linear movement of the follower should be perpendicular to this plane. The circumferential faces of such conically-shaped cutters may be concave just as the cylindrically shaped cutters before described in order to cut the follower with the desired "barrelled" form.

What I claim is:—

1. A vehicle steering gear follower for transmitting motion between a helical thread on the steering shaft and the vehicle steering arm, comprising a cylindrical body mounted rotatably about its longitudinal axis in said steering arm and having a substantially rectangular projecting end substantially the same width as said thread for engagement with it, the contacting surfaces of said end being substantially helical about said longitudinal axis.

2. A vehicle steering gear follower for transmitting motion between a helical thread on the steering shaft and the vehicle steering arm, comprising a cylindrical body mounted rotatably about its longitudinal axis in said steering arm and having a substantially rectangular projecting end substantially the same width as said thread for engagement with it, the contacting surfaces of said projecting end being curved inwardly towards the end.

3. A vehicle steering gear follower for transmitting motion between a helical thread on the steering shaft and the vehicle steering arm, comprising a cylindrical body mounted rotatably about its longitudinal axis in said steering arm and having a substantially rectangular projecting end substantially the same width as said thread for engagement with it, the contacting surfaces of said projecting end being substantially helical about said longitudinal axis and curved inwardly towards the end.

4. A vehicle steering gear follower for transmitting motion between a helical thread on the steering shaft and the vehicle steering arm, comprising a cylindrical body mounted rotatably about its longitudinal axis in said steering arm and having a substantially rectangular projecting end substantially the same width as said thread for engagement with it, the contacting surfaces of said end being substantially helical about said longitudinal axis and each having a shallow recess arranged centrally and approximately parallel with said axis.

5. A vehicle steering gear follower for transmitting motion between a helical thread on the steering shaft and the vehicle steering arm, comprising a cylindrical body mounted rotatably about its longitudinal axis in said steering arm and having a substantially rectangular projecting end substantially the same width as said thread for engagement with it, the contacting surfaces of said projecting end being curved inwardly towards the end and each having a shallow recess arranged centrally and approximately parallel with said axis.

6. A vehicle steering gear follower for transmitting motion between a helical thread on the steering shaft and the vehicle steering arm, comprising a cylindrical body mounted rotatably about its longitudinal axis in said steering arm and having a substantially rectangular projecting end substantially the same width as said thread for engagement with it, the contacting surfaces of said projecting end being substantially helical about said longitudinal axis and curved inwardly towards the end and each having a shallow recess arranged centrally and approximately parallel with said axis.

7. A vehicle steering gear follower for transmitting motion between a helical thread on the steering shaft and the vehicle steering arm, comprising a body mounted for movement on the steering arm and having a substantially rectangular projecting end substantially the same width as said thread for engagement therewith, the contacting surfaces of said end being substantially helical about a line perpendicular to the axis of said thread and each having a shallow recess arranged centrally and approximately parallel to said perpendicular line.

FREDERICK GEORGE MATRAVERS.